UNITED STATES PATENT OFFICE 2,594,526

INSECTICIDAL COMPOSITIONS COMPRISING FLUORINATED CHLORINATED CYCLIC TERPENES

George Allen Buntin and Arthur D. Lohr, Wilmington, Del., assignors to Hercules Powder Company, Wilmington, Del., a corporation of Delaware No Drawing. Application March 16, 1948, Serial No. 15,269

8 Claims. (Cl. 167—30)

This invention relates to new halogenated terpene compounds and more particularly to fluorinated chlorinated terpenes and to insecticidal compositions containing these new compounds as the active ingredient.

In accordance with this invention it has been discovered that fluorinated chlorinated cyclic terpenes may be prepared and that insecticidal compositions containing these fluorinated chlorinated terpenes and preferably those having a total halogen content of about 40% to about 75% possess an exceptionally high degree of insecticidal activity.

The following examples illustrate the preparation of the new fluorinated chlorinated terpenes and the insecticidal activity of compositions containing them. All parts and percentages are by weight unless otherwise indicated.

Example 1

Eighty-three parts of a chlorinated camphene containing 67.4% chlorine were pulverized by grinding with Dry Ice and mixed with 86.5 parts of powdered mercuric oxide. The mixture, in a platinum vessel, was placed on cracked ice under a hood and sufficient liquid hydrogen fluoride was added to cover the mixture of mercuric oxide and chlorinated camphene. After the unreacted hydrogen fluoride had evaporated, the residue was poured on crushed ice. The viscous organic liquid which remained undissolved was triturated under the ice water. It was then taken up with carbon tetrachloride, filtered and the organic layer was dried over anhydrous sodium sulfate and finally evaporated to dryness. The product was then dissolved in hexane, the solution filtered, and the solvent removed under reduced pressure. The fluorinated chlorinated camphene so prepared was a very viscous, amber liquid which contained 61.2% chlorine and 2.6% fluorine.

The above fluorinated chlorinated camphene was tested for its insecticidal activity against houseflies. In this and the following examples, the test for insecticidal activity against houseflies was made in the following manner and is referred to in this specification as the Bell jar method.

Approximately 100 five-day old flies (Musca domestica) were placed in a Bell jar and a predetermined quantity of the insecticide to be tested was atomized into the Bell jar. The quantity of insecticide used was equal to the amount of the official test insecticide which was necessary to give a 30% to 55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

The results of tests made on 0.5% and 0.25% solutions of the fluorinated chlorinated camphene in deodorized kerosene are given in the following table. The data are an average of a series of tests made on each solution.

| Concentration of Solution | Percent Dead in 24 Hrs. | O. T. I. Difference |
|---|---|---|
| Per Cent | | |
| 0.5 | 100 | +51 |
| 0.25 | 100 | +51 |

Example 2

The preparation of fluorinated chlorinated camphene described in Example 1 was repeated except that the reaction mixture was twice covered with hydrogen fluoride. The product so prepared was an orange-colored, soft solid containing 61.4% chlorine and 3.8% fluorine.

Solutions of this product in deodorized kerosene were tested for their insecticidal activity against houseflies by the Bell jar method with the following results:

| Concentration of Solution | Percent Dead in 24 Hrs. | O. T. I. Difference |
|---|---|---|
| Per Cent | | |
| 0.5 | 100 | +51 |
| 0.25 | 99 | +50 |

Example 3

A chlorinated camphene containing 61.3% chlorine was fluorinated as described in Example 1. The product obtained was a very viscous, amber-colored liquid and contained 5.2% fluorine and 54.1% chlorine. An 0.25% solution of this fluorinated chlorinated camphene in deodorized kerosene had a kill of 93%, which was equal to an O. T. I. difference of +43, when tested against houseflies by the Bell jar method.

Example 4

A chlorinated camphene containing 65.1% chlorine was fluorinated as described in Example 1. The product so obtained contained 53.2% chlorine and 5.6% fluorine. This material was then chlorinated by passing chlorine into a solution of it in carbon tetrachloride in the presence of ultraviolet light. The fluorinated chlorinated camphene so prepared contained 59.3% chlorine and 5.0% fluorine. Solutions of this product in deodorized kerosene were tested for their insecticidal activity against houseflies by the Bell jar method with the following results:

| Concentration of Solution | Percent Dead in 24 Hrs. | O. T. I. Difference |
|---|---|---|
| Per Cent | | |
| 0.25 | 99 | +49 |
| 0.1 | 66 | +16 |

*Example 5*

A chlorinated pinene containing 67.7% chlorine (obtained by chlorinating a commercial α-pinene) was fluorinated by treatment with mercuric oxide and hydrogen fluoride in the same manner as described in Example 1. The fluorinated chlorinated pinene so obtained was a very viscous, amber-colored liquid and contained 3.8% fluorine and 61.4% chlorine. An 0.25% solution of this product in deodorized kerosene had a 24-hour kill of 80%, which was equal to an O. T. I. difference of +30, when tested against houseflies by the Bell jar method.

The new halogenated terpenes in accordance with this invention are substituted terpenes containing both chlorine and fluorine. These new fluorinated chlorinated terpenes may be prepared by fluorinating a chlorinated terpene or by chlorinating a fluorinated terpene. The first of these methods involves the replacement of a portion of the chlorine of a chlorinated terpene with fluorine whereas in the second method, the fluorinated terpene is further halogenated by chlorine.

Any cyclic terpene may be halogenated to produce the fluorinated chlorinated terpenes of this invention. Terpenes which may be used to prepare these new halogenated products are the monocyclic terpenes or dihydroterpenes such as dipentene, terpinene, limonene, phellandrene, carvomenthene, menthene, etc., bicyclic terpenes or dihydroterpenes such as camphene, camphene hydrochloride, camphane, isocamphane, α-pinene, β-pinene, pinene hydrochloride, pinane, fenchene, bornyl chloride, isobornyl chloride, etc., and the tricyclic terpene, tricyclene.

The fluorination of a chlorinated terpene may be carried out by reacting the chlorinated terpene with hydrogen fluoride or with a metal fluoride. For example, a portion of the chlorine of a chlorinated terpene may be replaced by treating the chlorinated terpene with hydrogen fluoride in the presence of mercuric oxide, which reaction, illustrated in the foregoing examples, is usually carried out at a temperature of about 0° C. to 19.4° C., the boiling point of hydrogen fluoride. The reaction with hydrogen fluoride may also be carried out under pressure, whereby higher reaction temperatures such as about 50° C. to about 150° C. may be used. Antimony pentachloride may be used as a catalyst in the latter reaction. The chlorinated terpene may also be treated with a metallic fluoride, such as antimony trifluoride, which reaction is usually carried out in the presence of antimony pentachloride as a catalyst, and at a temperature of about 50° C. to about 150° C. at either atmospheric or higher pressures. The degree of replacement of the chlorine by fluorine in the chlorinated terpene will usually depend upon the temperature and pressure at which the reaction is carried out.

The chlorinated terpenes which are fluorinated may be any chlorinated terpene and preferably are chlorinated terpenes containing from about 40% to about 75% chlorine and more preferably from about 55% to about 72% chlorine. The chlorination of the terpene may be carried out in the presence or absence of a solvent. Lower temperatures are maintained during the chlorination, if a solvent is used; however, in some instances it is preferable to use high temperatures in order to obtain the desired degree of chlorination. Suitable solvents for the chlorination are chloroform, carbon tetrachloride, pentachloroethane, etc. A chlorination catalyst may be used if desired, ultraviolet light or peroxide catalyst being particularly efficient.

The fluorinated chlorinated terpenes of this invention may also be prepared by the chlorination of a fluorinated terpene. The latter may be prepared by the direct fluorination of terpenes at room temperature with gaseous fluorine usually diluted with an inert gas such as nitrogen. The fluorination of a terpene may also be carried out by fluorination in the vapor phase over a cobalt fluoride catalyst at about 300° C. The fluorinated terpene is then chlorinated. The chlorination may be carried out as described above for the chlorination of a terpene. Usually the reaction is carried out by passing chlorine into a solution of the fluorinated terpene in an inert solvent such as carbon tetrachloride, in the presence of ultraviolet light.

The new fluorinated chlorinated cyclic terpenes in accordance with this invention are substituted terpenes containing both fluorine and chlorine. When used as the toxic ingredient of insecticidal compositions, it is preferable that the fluorinated chlorinated terpenes have a total halogen content of from about 40% to about 75% or more preferably from about 55% to about 72%. As may be seen from the foregoing examples, these fluorinated chlorinated terpenes have a very high degree of insecticidal activity.

The insecticidal compositions of this invention may be made up of the fluorinated chlorinated terpene admixed with any suitable type of a diluent. If a liquid spray is desired the fluorinated chlorinated terpene may be dissolved in any convenient solvent such as deodorized kerosene, crude kerosene, aromatic solvents, or alkylated aromatic solvents, or it may be dispersed in water to form aqueous sprays. Insecticidal dusts may be prepared by placing the fluorinated chlorinated terpene on a solid diluent or carrier such as powdered carbon, kieselguhr, bentonite, pyrophyllite, etc.

The fluorinated chlorinated terpenes may be used in combination with other insecticidal toxicants if desired. Examples of toxicants which may be combined with these new halogenated terpenes are rotenone, pyrethrum, alkyl thiocyanates, thiocyano ethers and terpene thiocyanoacylates.

The fluorinated chlorinated terpenes are useful in combatting flies, mosquitoes, roaches, moths and many other insect pests. These new products have an extremely high insecticidal activity, some of them giving a 100% kill against houseflies even at a concentration of 0.2%. The amount of the fluorinated chlorinated terpene to be admixed with the diluent depends upon the use to which the insecticidal composition will be put. For example, for use as a household fly spray a solution containing 0.25% to 2% of these compounds could be used, but when used as an agricultural dust a concentration of 10% to 20% or more may be desirable. Thus, the amount of the fluorinated chlorinated terpene in the insecticidal composition is determined by its ultimate use.

What we claim and desire to protect by Letters Patent is:

1. An insecticidal composition comprising a fluorinated chlorinated cyclic terpene and an insecticidal adjuvant as a carrier therefor, said fluorinated chlorinated cyclic terpene containing both chlorine and fluorine in total amount within the range of about 40% to about 75%, the fluorine content being about 2.6% to about 5.2% produced by substitution of part of the chlorine of a chlorinated cyclic terpene by fluorine by fluorination with a fluorinating agent selected from the group consisting of fluorine, hydrogen fluoride, and metal fluorides in the presence of a fluorination catalyst at a temperature below 300° C., said chlorinated cyclic terpene being the product of chlorination of a cyclic terpene with chlorine gas at an elevated temperature below that at which the product decomposes to a chlorine content of about 40% to 75%.

2. An insecticidal composition comprising a fluorinated chlorinated bicyclic terpene and an insecticidal adjuvant as a carrier therefor, said fluorinated chlorinated bicyclic terpene containing both chlorine and fluorine in total amount within the range of about 40% to about 75%, the fluorine content being about 2.6% to about 5.2% produced by substitution of part of the chlorine of a chlorinated bicyclic terpene by fluorine by fluorination with a fluorinating agent selected from the group consisting of fluorine, hydrogen fluoride, and metal fluorides in the presence of a fluorination catalyst at a temperature below 300° C., said chlorinated bicyclic terpene being the product of chlorination of a bicyclic terpene with chlorine gas at an elevated temperature below that at which the product decomposes to a chlorine content of about 40% to 75%.

3. An insecticidal composition comprising an fluorinated chlorinated camphene and an insecticidal adjuvant as a carrier therefor, said fluorinated chlorinated camphene containing both chlorine and fluorine in total amount within the range of about 40% to about 75%, the fluorine content being about 2.6% to about 5.2% produced by substitution of part of the chlorine of a chlorinated camphene by fluorine by fluorination with a fluorinating agent selected from the group consisting of fluorine, hydrogen fluoride, and metal fluorides in the presence of a fluorination catalyst at a temperature below 300° C., said chlorinated camphene being the product of chlorination of camphene with chlorine gas at an elevated temperature below that at which the product decomposes to a chlorine content of about 40% to 75%.

4. An insecticidal composition comprising a fluorinated chlorinated pinene and an insecticidal adjuvant as a carrier therefor, said fluorinated chlorinated pinene containing both chlorine and fluorine in total amount within the range of about 40% to about 75%, the fluorine content being about 2.6% to about 5.2% produced by substitution of part of the chlorine of a chlorinated pinene by fluorine by fluorination with a fluorinating agent selected from the group consisting of fluorine, hydrogen fluoride, and metal fluorides in the presence of a fluorination catalyst at a temperature below 300° C., said chlorinated pinene being the product of chlorination of pinene with chlorine gas at an elevated temperature below that at which the product decomposes to a chlorine content of about 40% to 75%.

5. An insecticidal composition comprising a fluorinated chlorinated bicyclic terpene and an insecticidal adjuvant as a carrier therefor, said fluorinated chlorinated bicyclic terpene containing both chlorine and fluorine in total amount within the range of about 55% to about 72%, the fluorine content being about 2.6% to about 5.2% produced by substitution of part of the chlorine of a chlorinated bicyclic terpene by fluorine by fluorination with a fluorinating agent selected from the group consisting of fluorine, hydrogen fluoride, and metal fluorides in the presence of a fluorination catalyst at a temperature below 300° C., said chlorinated bicyclic terpene being the product of chlorination of a bicyclic terpene with chlorine gas at an elevated temperature below that at which the product decomposes to a chlorine content of about 55% to 72%.

6. An insecticidal composition comprising a fluorinated chlorinated camphene and a solid insecticidal adjuvant as a carrier therefor, said fluorinated chlorinated camphene containing both chlorine and fluorine in total amount within the range of about 40% to about 75%, the fluorine content being about 2.6% to about 5.2% produced by substitution of part of the chlorine of a chlorinated camphene by fluorine by fluorination with a fluorinating agent selected from the group consisting of fluorine, hydrogen fluoride, and metal fluorides in the presence of a fluorination catalyst at a temperature below 300° C., said chlorinated camphene being the product of chlorination of camphene with chlorine gas at an elevated temperature below that at which the product decomposes to a chlorine content of about 40% to 75%.

7. An insecticidal composition comprising a fluorinated chlorinated camphene and a hydrocarbon insecticidal adjuvant as a carrier therefor, said fluorinated chlorinated camphene containing both chlorine and fluorine in total amount within the range of about 40% to about 75%, the fluorine content being about 2.6% to about 5.2% produced by substitution of part of the chlorine of a chlorinated camphene by fluorine by fluorination with a fluorinating agent selected from the group consisting of fluorine, hydrogen fluoride, and metal fluorides in the presence of a fluorination catalyst at a temperature below 300° C., said chlorinated camphene being the product of chlorination of camphene with chlorine gas at an elevated temperature below that at which the product decomposes to a chlorine content of about 40% to 75%.

8. An insecticidal composition comprising an aqueous dispersion of a fluorinated chlorinated camphene, said fluorinated chlorinated camphene containing both chlorine and fluorine in total amount within the range of about 40% to about 75%, the fluorine content being about 2.6% to about 5.2% produced by substitution of part of the chlorine of a chlorinated camphene by fluorine by fluorination with a fluorinating agent selected from the group consisting of fluorine, hydrogen fluoride, and metal fluorides in the presence of a fluorination catalyst at a temperature below 300° C., said chlorinated camphene being the product of chlorination of camphene with chlorine gas at an elevated temperature below that at which the product decomposes to a chlorine content of about 40% to 75%.

GEORGE ALLEN BUNTIN.
ARTHUR D. LOHR.

REFERENCES CITED

The following references are of record in the file of this patent:

UNITED STATES PATENTS

| Number | Name | Date |
| --- | --- | --- |
| 2,394,359 | Borglin | Feb. 5, 1946 |
| 2,431,969 | Struve | Dec. 2, 1947 |
| 2,436,135 | Barrick et al. | Feb. 17, 1948 |
| 2,565,471 | Buntin | Aug. 28, 1951 |